(No Model.)
W. W. BATCHELDER.
Gas Lighting Device.
No. 241,779.          Patented May 24, 1881.
Fig. 1.      Fig. 2.
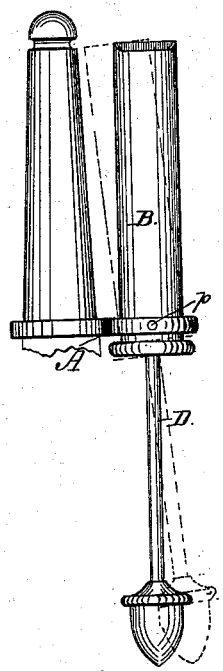
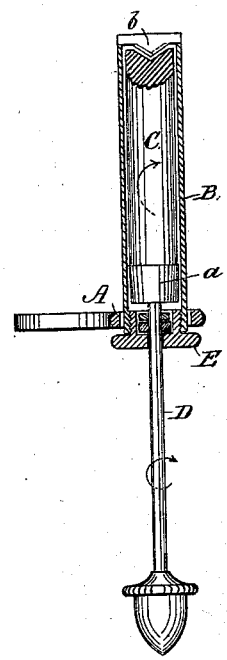
Fig. 3.
Fig. 4.
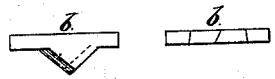
WITNESSES:
W. W. Hollingsworth
Edw. W. Byrn
INVENTOR:
W. W. Batchelder
BY
ATTORNEYS.

UNITED STATES PATENT OFFICE.

WILLIAM W. BATCHELDER, OF NEW YORK, N. Y.

GAS-LIGHTING DEVICE.

SPECIFICATION forming part of Letters Patent No. 241,779, dated May 24, 1881.

Application filed March 8, 1881. (No model.)

*To all whom it may concern:*

Be it known that I, WILLIAM W. BATCHELDER, of the city, county, and State of New York, have invented a new and Improved Gas-Lighting Device; and I do hereby declare that the following is a full, clear, and exact description of the same, reference being had to the accompanying drawings, forming part of this specification, in which—

Figure 1 is a side elevation of the device, showing it applied to a gas-burner. Fig. 2 is a sectional view of the same detached. Fig. 3 is an end view of the tube containing the match. Fig. 4 are enlarged detail views of the drill-point or cutting-edge.

My invention relates to an attachment to be applied to a gas-burner for the purpose of lighting the gas or to be used in any other connection desired.

I have heretofore patented devices for lighting the gas in which the lighting was effected by the union of two kinds of composition arranged in sticks side by side, which would not explode when separated in bulk but when scraped up and mixed formed a pulverulent charge, which was exploded by friction.

My present invention comprises a novel and simplified device for carrying out this principle, which is designed to utilize a peculiar continuous match, which is constructed on the above-described principle, and for which match I have made application for Letters Patent of even date herewith.

In the drawings, A represents a yoke, one ring of which is to be detachably fitted over the gas-burner and the other ring of which carries an upright tube, B. This tube B is pivoted in this yoke at *p*, so that its upper end can be projected nearer to the burner, as shown in dotted lines, than a parallel position would permit.

C is the continuous match, which I have more fully described in my other application referred to. It is sufficient for purposes of description in this case to state that it is composed of longitudinal sections of two kinds of composition which do not explode when separated, but when mixed can be exploded by friction, the energy of the explosion being reduced by a longitudinal section of some inert substance, which, when the match is to be used, is scraped up and mixed with the other compounds. The peculiar means for securing the scraping-up admixture and abrasion of these compositions as embodied in the single continuous match constitute my present invention, and these I will now proceed to describe.

The continuous match C is contained loosely in the tubular case B, and is carried at its lower end by a friction-cup, *a*, mounted on the end of a stem, D. This stem passes through a packing-ring in a screw-cap, E, at the lower end of tube A, which holds the match in the tube, and has at its lower end a thumb-piece or handle. The packing-ring in the screw-cap acts to produce a friction on stem D, which normally holds the end of the match against the cutting devices and prevent the match from having loose play in the tube. Now, the movement by which the compositions embodied in the match are ground up and ignited is a rotary movement of the match about its longitudinal axis, provision for which is made in this friction-cup and stem D, and by a cutting-edge, *b*, on the tube, which cutting-edge is made like a drill-point with a lower edge converging to a point in the center, and the edges on opposite sides of this point beveled in opposite directions, so that it cuts when turned in one direction and simply rubs when turned in the other. This tube is not designed to be turned, but only the match is rotated, which obviously secures the same result. This cutting-edge *b* is arranged diametrically across the top of tube A, as in Fig. 3, with its active edge down and in position to act upon the top of the continuous match. In this relation the cutting-edge has its point in line with the center of the match and cuts in the top of the match with its divergent edges to form a concavity which serves as a cut to hold the pulverulent charge against dropping out or being blown away. Now, by turning the continuous match one or two revolutions in the tube by the handle, carrying the same, and slightly pressing it up into engagement with the edge *b*, the several longitudinal sections of composition forming the match are slightly cut up to form a small pulverulent charge, which is more or less mixed by this movement; then by turning the handle back one or two revolutions the edge *b*, instead of cutting, simply, rubs the mass and explodes it, leaving the unmixed portions of the match remaining in bulk in an unaffected state. This flash occurring in proximity to the gas issuing from the gas-burner serves to ignite the same.

In the use of this device it will be seen that the composite structure of the single continuous match permits me to dispense with all mechanical appliances for feeding the same, since the match and its holder may be operated and fed forward by simple movement of the match, which is manipulated at will by the hand of the user.

What I claim as new is—

1. A lighting device consisting of a single continuous composite match, combined with a containing-tube having a pulverizing and rubbing surface, the said match being arranged, as described, to be fed forward by a rotary movement about its axis at the will of the operator and without mechanical feeding device, as described.

2. The combination, with a continuous match composed of longitudinal sections of composition having the property of igniting when mixed and rubbed without igniting when separated, of a beveled cutting-edge, as described, adapted to cut up and loosen the material when either it or the match is moved in one direction, and to rub and ignite the materials without cutting when moved in the opposite direction, as described.

3. The combination of a tube having a cutting-edge at one end, a continuous match constructed of materials having the properties described, and a carrier or holder for said match, whereby the match is ignited by a movement about its longitudinal axis.

4. The combination, with the continuous match constructed of materials as described, of a cutting-edge having a point in the center arranged in line with the axis of match and reversely inclined and diverging edges on opposite sides, whereby the match is worn away with a concavity in its end which retains the pulverized charge, as set forth.

5. The combination of the yoke A, carrying-tube B, having a cutting-edge, b, across its open end, the continuous match C, the stem D, having a friction-cup, a, for holding the match, and the cap E for tube B, having a packing-ring for the stem D, substantially as shown and described.

W. W. BATCHELDER.

Witnesses:
 CHAS. A. PETTIT,
 EDW. W. BYRN.